March 15, 1932.  G. PAGE  1,849,434
ARTIFICIAL BAIT
Filed April 3, 1931
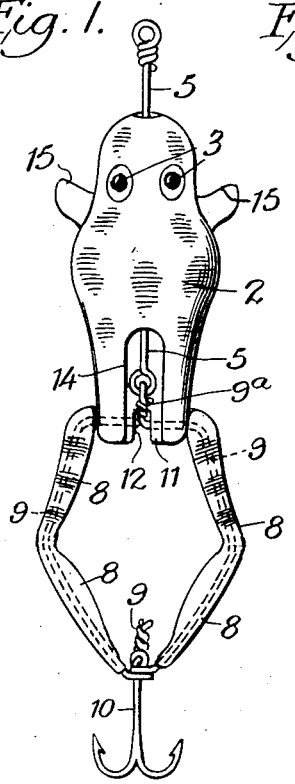
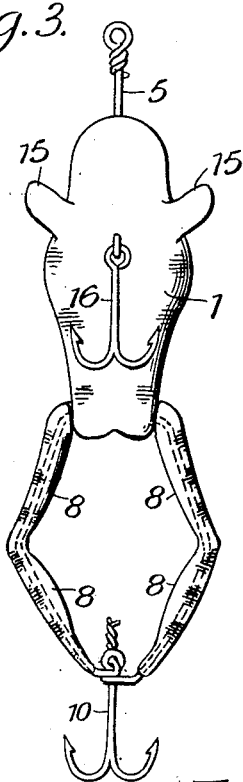
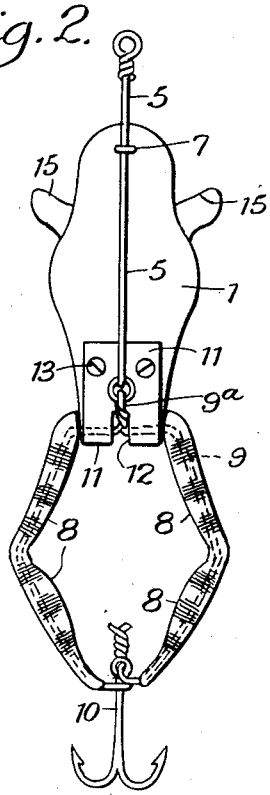
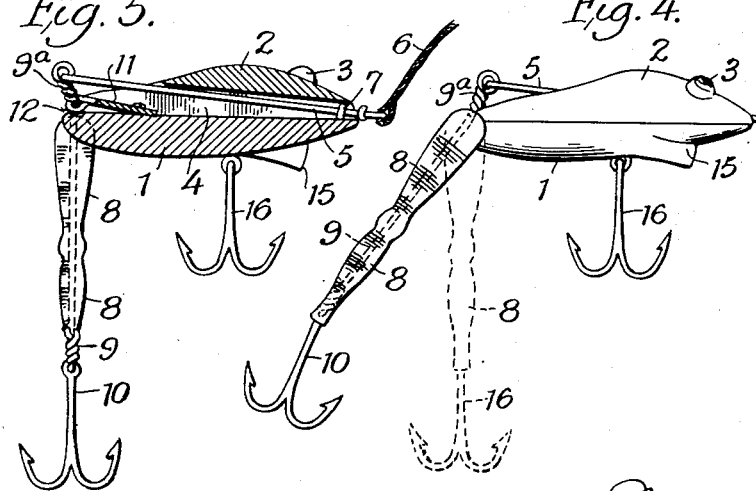
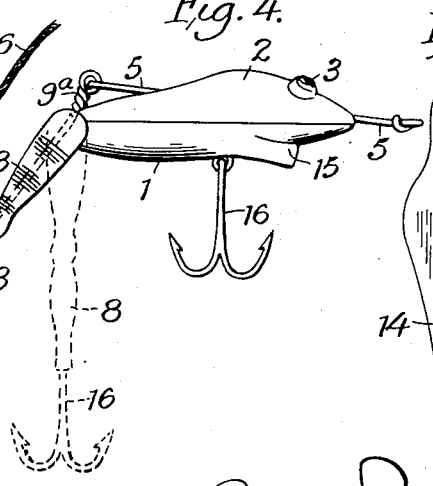
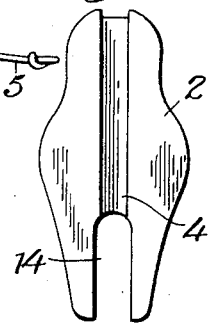
Grover Page, Inventor Patented Mar. 15, 1932

1,849,434

UNITED STATES PATENT OFFICE

GROVER PAGE, OF NEW ALBANY, INDIANA

ARTIFICIAL BAIT

Application filed April 3, 1931. Serial No. 527,559.

This invention is a novel improvement in artificial bait, and the principal object thereof is to provide an artificial bait which will float upon the surface of the water, the bait representing a live frog lying on the surface of the water with hind legs dangling idly in the water; with means provided whereby when the fishing line is jerked the hind legs will be actuated by the line to swing upwardly in a vertical arc into substantially horizontal position, the hind legs again dropping when the tension on the line is released, thereby giving a life-like action to the bait resembling the kicking action of a live frog.

I will explain the invention with reference to the accompanying drawings which illustrate one practical embodiment thereof to enable others to adopt and use the same; and will summarize in the claims the novel features of construction, and novel combinations of parts, for which protection is desired.

In said drawings:

Fig. 1 is a top plan view of the bait.

Fig. 2 is a top plan view with the upper portion of the body removed.

Fig. 3 is a bottom plan view of the bait.

Fig. 4 is a side elevation of the bait indicating in dotted lines, the swing of the legs.

Fig. 5 is a vertical section through the bait shown in Fig. 4.

Fig. 6 is a bottom plan view of the upper portion of the bait body.

As shown, my novel artificial bait preferably resembles in general contour and appearance a live frog, and comprises a body portion of buoyant material, such as wood cork, or similar material, adapted to float upon the surface of the water. The body portion is preferably made in two parts and consists of a lower portion 1 and an upper portion 2 suitably connected together, the upper portion 2 being shaped to resemble the head and back of a frog, the same being provided with knobs 3 (Figs. 1—4—5) simulating the eyes of a frog.

In the underside of the upper portion 2 is a longitudinal groove 4 (Figs. 5 and 6) adapted when portions 1 and 2 are assembled to form an axially disposed bore in the body through which passes an actuating link 5, said link being adapted to be connected in the usual manner with the end of the fishing line 6 (Fig. 5). The forward end of link 5 may be held in position by means of an eyelet (Figs. 2 and 5).

The hind legs of the bait preferably consist of wooden or cork spools 8 strung on brass or other rustless wire 9, the legs normally hanging downwardly in the water and dangling idly in a vertical position. Wire 9 is preferably substantially U-shaped and the outer ends of the wire 9 beyond the outer spools 8 are wrapped around a fish hook 10 and then twisted or otherwise connected together, the wire 9 thereby forming in effect a loop, and the legs thus always swinging together.

The inner end of the wire loop 9 is connected by a hinge 11 to body 1, said hinge being preferably disposed between the body portions 1 and 2 and attached by screws or the like to the rear of the portion 1. Hinge 11 is axially recessed as at 12 to accommodate an upstanding arm 9a formed in wire 9 by twisting the wire. The upper end of arm 9a is connected to the end of link 5 hereinbefore referred to, whereby when the link 5 is pulled the legs 8 will be swung from vertical to horizontal position. The upper portion 2 of the body is provided with a forwardly extending recess 14 (Figs. 1 and 6) to accommodate arm 9a and the rear end of link 5, but the rear corners of portion 2 substantially cover the hinge 11.

In order to set up sufficient water resistance so as to retard movement of the bait, when the fishing line is jerked, to cause the link 5 to swing the legs 8, faces 15 are provided near the front end of body 1 which correspond with the front legs of a live frog, said faces 15 being relatively short but having their front faces of relatively large area. An additional fish hook 16 is also preferably connected by an eyelet to the underside of the body 1 at a point substantially between the faces 15.

The above construction produces a floating bait resembling a frog, in which the hind legs normally dangle vertically in the water while the body is floating, but when the fishing line is pulled link 5 will be actuated to cause the legs to swing upwardly into substantially horizontal position, sufficient water resistance retarding forward movement of the bait being set up by the water resistance faces 15, and the bait will thus assume the life-like kicking action of a frog lying on the surface of the water, as distinguished from the usual retrieve motion of the "plug" bait now in general use.

I do not limit my invention to the exact form shown in the drawings, for obviously changes may be made therein within the scope of the claims.

I claim:—

1. An artificial bait, comprising a buoyant body, a member hinged to the body and normally hanging downwardly; a hook carried by said member; and an arm on said member to be connected with the fishing line whereby when the latter is pulled the member will be swung upwardly into substantially horizontal position.

2. In an artificial bait as set forth in claim 1, said body comprising upper and lower portions connected together, the lower portion carrying the hinge; and the upper portion covering the hinge and having a longitudinal guide therein for the fishing line.

3. In an artificial bait as set forth in claim 1, said member comprising a wire frame having an offset portion forming the arm disposed adjacent the hinge.

4. An artificial bait, comprising a buoyant body, a movable link on the body to be connected to the fishing line; a member hinged to the body and normally hanging downwardly; a hook carried by said member; and an arm on said member connected with the link, whereby a pull on the fishing line will swing the member upwardly into substantially horizontal position.

5. In an artificial bait as set forth in claim 4, said body comprising upper and lower portions connected together, the lower portion carrying the hinge; and the upper portion covering the hinge and having a longitudinal guide therein for the link.

6. In an artificial bait as set forth in claim 4, said member comprising a wire frame having a twisted portion forming the arm disposed adjacent the hinge.

7. An artificial bait, comprising a buoyant body, a movable link on the body to be connected to the fishing line; water resistance faces to oppose movement of the body when in the water; a member hinged to the body and normally hanging downwardly; a fish hook carried by the frame; and an arm on the frame connected with the link whereby a pull on the fishing line will swing the member upwardly into substantially horizontal position.

8. In an artificial bait as set forth in claim 7, said body comprising upper and lower portions connected together, the lower portion carrying the water resistance faces and the hinge; and the upper portion covering the hinge and having a groove in its under side for the link.

9. In an artificial bait as set forth in claim 7, said member comprising a wire frame having a twisted portion forming the arm disposed adjacent the hinge.

10. An artificial bait, comprising a buoyant body resembling the body and head of a frog; a link extending axially of the body and to be connected with the fishing line, leg members resembling the hind legs of a frog hinged to the body and normally hanging downwardly, a fish hook carried by the leg members; and an arm on the leg members connected with the link, whereby a pull on the fishing line will swing the leg members upwardly into substantially horizontal position.

11. In an artificial bait as set forth in claim 10, said body comprising upper and lower portions connected together, the lower portion carrying the hinge; and the upper portion covering the hinge and having a longitudinal groove in its under surface for the link.

12. In an artificial bait as set forth in claim 10, said leg members consisting of a U-shaped wire member having a twisted portion forming the arm disposed adjacent the hinge; the ends of the wire being connected to the hook.

13. In an artificial bait as set forth in claim 10, said leg members consisting of a U-shaped wire member having a twisted portion in its base forming the arm disposed adjacent the hinge; the ends of the wire being connected with the hook; and spools strung on the wire at each side of the hook extending to the hinge, said spools being shaped to simulate the hind legs of a live frog.

14. In combination with an artificial bait as set forth in claim 10, water resisting faces extending from each side of the body corresponding with the front legs of a frog, and shaped to offer resistance against forward movement of the body in the water.

GROVER PAGE.